(12) United States Patent
Valeri et al.

(10) Patent No.: US 11,396,306 B2
(45) Date of Patent: Jul. 26, 2022

(54) DRIVER ALERT SYSTEMS AND CONTROL LOGIC WITH POWERTRAIN POTENTIAL ENERGY INDICATIONS IN ELECTRIC-DRIVE VEHICLES

(71) Applicant: GM GLOBAL TECHNOLOGY OPERATIONS LLC, Detroit, MI (US)

(72) Inventors: Frank C. Valeri, Novi, MI (US); Glenn Pietila, Howell, MI (US); Alan P. Oppenheiser, Oakland, MI (US); Mayra A. Martinez Diaz, Orion Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 204 days.

(21) Appl. No.: 16/882,793

(22) Filed: May 26, 2020

(65) Prior Publication Data
US 2021/0370967 A1    Dec. 2, 2021

(51) Int. Cl.
| | |
|---|---|
| *B60W 50/16* | (2020.01) |
| *B60W 10/10* | (2012.01) |
| *B60W 50/04* | (2006.01) |
| *B60W 10/08* | (2006.01) |
| *B60W 50/14* | (2020.01) |

(52) U.S. Cl.
CPC ............ *B60W 50/16* (2013.01); *B60W 10/08* (2013.01); *B60W 10/10* (2013.01); *B60W 50/04* (2013.01); *B60W 2050/143* (2013.01); *B60W 2520/10* (2013.01)

(58) Field of Classification Search
CPC ...... B60W 50/16; B60W 10/08; B60W 10/10; B60W 50/04; B60W 2050/143; B60W 2520/10; B60W 2050/146; B60W 2510/083; B60W 50/14; B60W 2510/06; B60W 2510/08
See application file for complete search history.

(56) References Cited

U.S. PATENT DOCUMENTS 6,076,899 A  *  6/2000  Isella ................ B60T 11/103
                                                   303/3
7,908,064 B2    3/2011  Cawthorne et al.
(Continued)

*Primary Examiner* — Mary Cheung
(74) *Attorney, Agent, or Firm* — Quinn IP Law

(57) ABSTRACT

Presented are driver alert systems with control logic for powertrain energy tracking and reporting, methods for making/using such systems, and electric-drive vehicles with alert systems for providing driver cues to indicate real-time potential energy buildup in the powertrain. A method of operating a driver alert system for an electric-drive vehicle includes a vehicle controller receiving a selection of a powertrain operating mode. Responsive to the received selection, the vehicle controller determines a buildup of output torque generated via an electric traction motor for an impending vehicle maneuver associated with the selected powertrain operating mode. The controller accesses a memory-stored, torque-based lookup table to retrieve an output level calibrated to an in-vehicle sensory output device and corresponding to an output torque value for the determined torque buildup. The controller then commands the sensory output device to generate a driver-perceptible visible, audible, and/or tactile cue based on the retrieved output level.

20 Claims, 2 Drawing Sheets

(56) References Cited

U.S. PATENT DOCUMENTS

| | | |
|---|---|---|
| 8,046,142 B2 | 10/2011 | Morris et al. |
| 8,175,785 B2 | 5/2012 | Turski et al. |
| 9,237,399 B2 | 1/2016 | Lagodzinski et al. |
| 9,348,793 B2 | 5/2016 | Singer et al. |
| 10,086,833 B1 | 10/2018 | Duan et al. |
| 10,611,323 B2 | 4/2020 | Valeri et al. |
| 2005/0054480 A1* | 3/2005 | Ortmann ............... B60W 20/00 903/910 |
| 2008/0227589 A1* | 9/2008 | Zillmer ................. F02D 41/064 477/3 |
| 2011/0125382 A1* | 5/2011 | Bonfigt .................. B60T 8/175 701/70 |
| 2013/0090806 A1 | 4/2013 | Hahne |
| 2013/0342339 A1 | 12/2013 | Kiefer et al. |
| 2015/0291167 A1* | 10/2015 | Mair ..................... B60W 10/02 701/68 |
| 2018/0230927 A1* | 8/2018 | Hayden ............... F02D 41/0002 |
| 2018/0321678 A1 | 11/2018 | Valeri et al. |

* cited by examiner

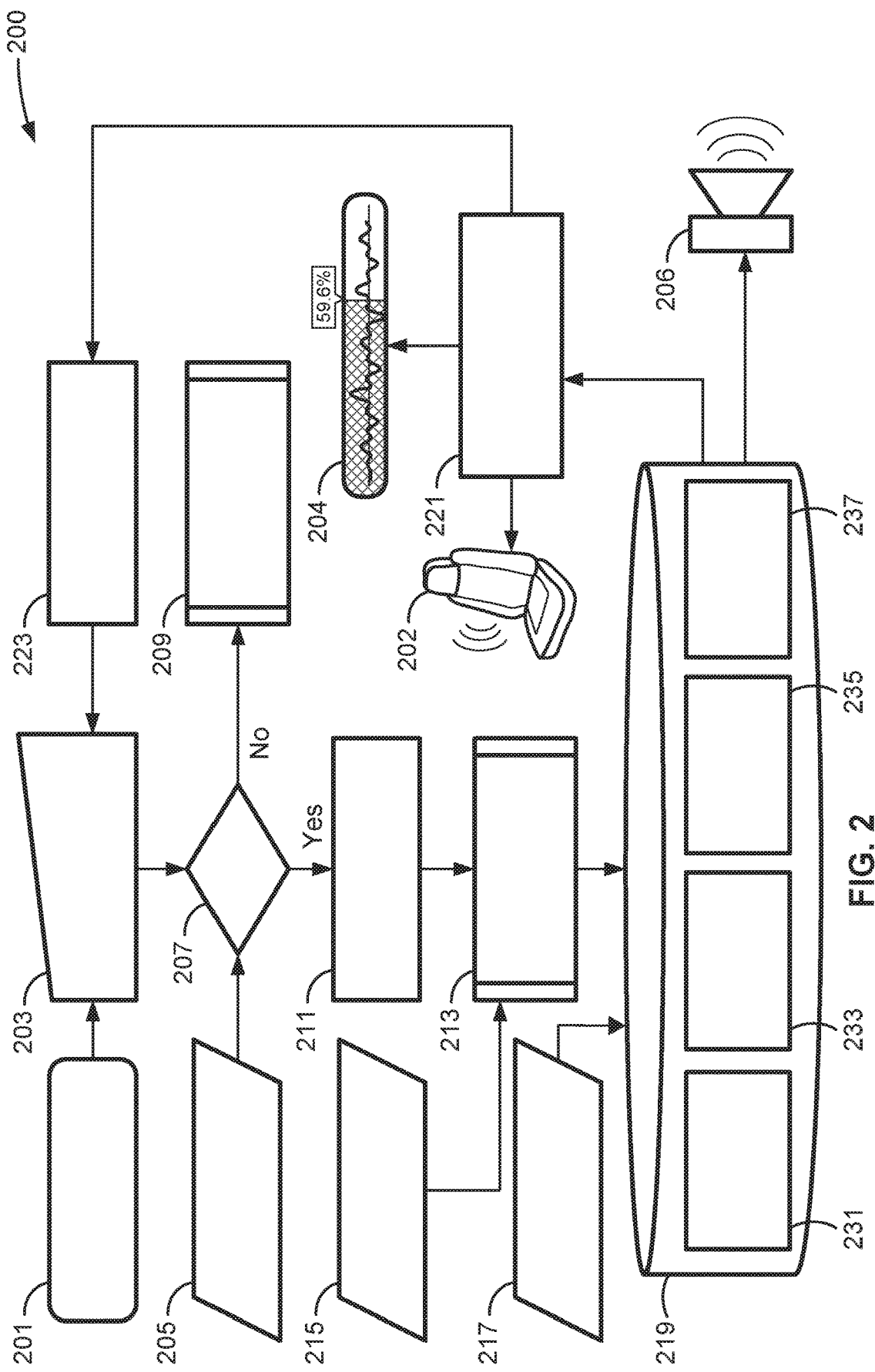

DRIVER ALERT SYSTEMS AND CONTROL LOGIC WITH POWERTRAIN POTENTIAL ENERGY INDICATIONS IN ELECTRIC-DRIVE VEHICLES

INTRODUCTION

The present disclosure relates generally to electric-drive vehicles. More specifically, aspects of this disclosure relate to systems and methods for monitoring torque generation in a hybrid-electric or full-electric vehicle powertrain.

Current production motor vehicles, such as the modern-day automobile, are originally equipped with a powertrain that operates to propel the vehicle and power the vehicle's onboard electronics. In automotive applications, for example, the vehicle powertrain is generally typified by a prime mover that delivers driving torque through an automatic or manually shifted power transmission to the vehicle's final drive system (e.g., differential, axle shafts, road wheels, etc.). Automobiles have historically been powered by a reciprocating-piston type internal combustion engine (ICE) assembly due to its ready availability and relatively inexpensive cost, light weight, and overall efficiency. Such engines include compression-ignited (CI) diesel engines, spark-ignited (SI) gasoline engines, two, four, and six-stroke architectures, and rotary engines, as some non-limiting examples. Hybrid electric and full electric ("electric-drive") vehicles, on the other hand, utilize alternative power sources to propel the vehicle and, thus, minimize or eliminate reliance on a fossil-fuel based combustion engine for tractive power.

A full electric vehicle (FEV)—colloquially branded as an "electric car"—is a type of electric-drive vehicle configuration that altogether removes the internal combustion engine and attendant peripheral components from the powertrain system, relying solely on electric traction motors for propulsion and for supporting accessory loads. The engine assembly, fuel supply system, and exhaust system of an ICE-based vehicle are replaced with a single or multiple traction motors, a traction battery back, and battery cooling and charging hardware in an FEV. Hybrid electric vehicle (HEV) powertrains, in contrast, employ multiple sources of tractive power to propel the vehicle, most commonly operating an internal combustion engine assembly in conjunction with a battery-powered or fuel-cell-powered traction motor. Since hybrid-type, electric-drive vehicles are able to derive their power from sources other than the engine, HEV engines may be turned off, in whole or in part, while the vehicle is propelled by the electric motor(s).

The expansion of available FEV and HEV powertrain architectures facilitates the development and implementation of different vehicle operating modes that improve vehicle efficiency, range, and drivability. HEV powertrains, for example, may be equipped with an electric motor generator unit (MGU) that operates in a "cranking mode" to provide a starting function to the internal combustion engine, a "launch mode" for electrically dominated vehicle launches from stop or idle, a "boost mode" to supplement engine output as the vehicle accelerates quickly during a dynamic vehicle maneuver, and a "regenerative mode" for recapturing braking energy by operating the MGU in a generator mode to recharge the battery pack. In newer FEV powertrains, some high-performance operating modes, such as active traction control ("performance launch") and torque boost control ("rock climbing"), are available for manual selection by a driver or for automated execution by the vehicle's powertrain control module (PCM). To eliminate driveline lash and any attendant noise, vibration, and harshness (NVH), these operating modes may amass an accretion of potential energy (torque) in the propulsion system prior to vehicle movement.

SUMMARY

Presented herein are driver alert systems with control logic for powertrain energy tracking and reporting, methods for making and methods for operating such systems, and electric-drive vehicles with resident alert systems for providing driver cues to indicate real-time potential energy levels in the powertrain. By way of illustration, there are presented methods of providing audible, visual, and/or tactile cues to a vehicle driver that indicate a potential energy buildup in the propulsion system in response to an operating mode selection. For instance, upon user selection of a vehicle-calibrated EV operating mode, the propulsion system may begin to ramp-up driveline torque for an impending vehicle maneuver. In tandem, the resident driver alert system tracks the buildup of potential energy and progressively increases an audible or tactile cue that matches the dynamic increase of EV propulsion system torque. The tactile cue may be applied by a haptic transducer to a driver interface, such as a driver seat, steering wheel, pedal, center console, armrest, etc.; the transducer's vibrational output may be continuously modulated in correlation with the increasing torque being applied to the driveline. In so doing, the driver alert system enhances driver awareness and response time by providing user-perceptible feedback that corresponds directly to real-time powertrain operating status.

Aspects of this disclosure are directed to in-vehicle driver alert systems with attendant control logic for powertrain energy tracking and reporting. In an example, a driver alert system is presented for an electric-drive vehicle, such as a hybrid-electric or full-electric vehicle propelled by a powertrain with one or more electric traction motors. The driver alert system includes one or more sensory output devices that mount to the electric-drive vehicle and generate visible, audible, and/or tactile outputs that are perceptible by a driver of the vehicle. A resident or remote memory device or network of memory devices stores one or more torque-based lookup tables, each of which correlates a series of calibrated output levels of the sensory output device (e.g., haptic signal gain, sound file gain, sound file pitch, etc.) with a progression of calibrated torque values of the electric traction motor.

Continuing with the discussion of the above example, the driver alert system also includes a resident or remote controller that communicatively connects to the sensory output device(s) and memory device(s). The controller is programmed to receive, e.g., from the driver or the PCM, a selection of a powertrain operating mode from a predefined set of operating modes. Responsive to this selection, the controller determines an output torque accrual of torque generated via the electric traction motor and stored in the powertrain in anticipation of an impending vehicle maneuver associated with the selected powertrain operating mode. The controller then accesses the memory-stored, torque-based lookup table(s) and retrieves therefrom a calibrated output level corresponding to an output torque value for the determined output torque accrual. The controller then transmits one or more command signals to the sensory output device(s) to generate a visible, audible, and/or tactile cue based on the retrieved output level.

Additional aspects of this disclosure are directed to motor vehicles equipped with resident alert systems for providing driver cues to indicate real-time potential energy levels in the powertrain. As used herein, the terms "vehicle" and "motor vehicle" may be used interchangeably and synonymously to include any relevant vehicle platform, such as passenger vehicles (ICE, HEV, FEV, fuel cell, fully and partially autonomous, etc.), commercial vehicles, industrial vehicles, tracked vehicles, off-road and all-terrain vehicles (ATV), motorcycles, farm equipment, watercraft, aircraft, etc. In an example, an electric-drive vehicle includes a vehicle body with a passenger compartment, multiple road wheels, and other standard original equipment. For electric-drive vehicle applications, one or more electric traction motors operate alone (e.g., for FEV powertrains) or in conjunction with an internal combustion engine assembly (e.g., for HEV powertrains) to selectively drive one or more of the road wheels to thereby propel the vehicle. The vehicle also includes one or more sensory output devices that is/are attached to the vehicle body and located inside the passenger compartment. Each sensory output device is operable to generate a driver-perceptible visible, audible, and/or tactile output. In addition, one or more memory devices store one or more torque-based lookup tables, each of which correlates a series of calibrated output levels of the sensory output device with a progression of calibrated torque values of the electric traction motor.

Continuing with the discussion of the above example, the vehicle also includes one or more controllers that is/are communicatively connected to the sensory output device(s) and memory device(s). At least one of the controllers is programmed to execute memory-stored instructions to perform select operations, including: receiving, e.g., via a center-stack infotainment unit or PCM, a selection of a powertrain operating mode; monitor the accrual of torque that is output via the electric traction motor(s) and stored in the vehicle powertrain in anticipation of an impending vehicle maneuver associated with the selected powertrain operating mode; retrieve, from one or more of the memory-stored, torque-based lookup tables, a calibrated output level associated with a calibrated torque value corresponding to the determined output torque accrual; and command the sensory output device to generate one or more visible, audible, and/or tactile cues based on the retrieved output level(s).

Also presented herein are methods for manufacturing and methods for operating any of the disclosed vehicles, systems, and devices. In an example, a method is presented for operating a driver alert system for an electric-drive vehicle. This representative method includes, in any order and in any combination with any of the above and below disclosed options and features: receiving, via a vehicle controller, a selection of a powertrain operating mode for a vehicle powertrain; determining, via the vehicle controller responsive to receiving the selected powertrain operating mode, an output torque accrual of torque generated via an electric traction motor and stored in the powertrain for the selected powertrain operating mode; accessing a torque-based lookup table stored in a memory device, the torque-based lookup table correlating a series of calibrated output levels of a sensory output device with a progression of calibrated torque values of the electric traction motor; retrieving, via the controller from the torque-based lookup table, an output level from the series of calibrated output levels associated with a torque value in the progression of calibrated torque values corresponding to the determined output torque accrual; and transmitting, via the controller to the sensory output device, a command signal to generate a driver-perceptible visible, audible, and/or tactile cue based on the retrieved output level.

For any of the disclosed systems, methods, and vehicles, the controller may be programmed to respond to the selected powertrain operating mode by determining a real-time vehicle speed of the electric-drive vehicle, and determine if this real-time speed is approximately equal to zero. In this instance, the controller transmits the command signal(s) to the sensory output device(s) responsive to a determination that the real-time vehicle speed is approximately equal to zero. As a further option, determining the electric-drive vehicle's real-time speed may include receiving sensor data from a vehicle speed sensor via a controller area network (CAN) bus. Moreover, determining the accrual of output torque in the powertrain may be performed as a direct response to the real-time vehicle speed being approximately equal to zero. Responsive to the real-time vehicle speed not being zero or about zero, the controller may initiate a default driver feedback module operable to augment a predefined set of powertrain system sounds.

For any of the disclosed systems, methods, and vehicles, the controller may be programmed to respond to receipt of the selected powertrain operating mode by determining a set of calibrated powertrain settings associated with the selected operating mode; and determine a suite of tuning coefficients assigned to this set of calibrated powertrain settings. In this instance, the retrieved output level(s) for the sensory output device(s) is/are based, at least in part, on the suite of tuning coefficients. As a further option, the memory-stored lookup table(s) may include: a sound tone torque-based gain table correlating a series of tones with the progression of calibrated torque values; a sound file torque-based gain table correlating a series of sound file gains with the progression of calibrated torque values; and a sound file torque-based pitch table correlating a series of sound file pitches with the progression of calibrated torque values.

For any of the disclosed systems, methods, and vehicles, the sensory output device may include a haptic transducer that is operable, in response to a command signal, to generate a dynamic haptic cue indicative of dynamic changes in the output torque accrual. As a further option, the sensory output device may include an audio system component that is operable, in response to a command signal, to generate a dynamic sound output indicative of dynamic changes in the output torque accrual. In the same vein, the sensory output device may include an electronic display device that is operable, in response to a command signal, to generate a dynamic visual output indicative of dynamic changes in the output torque accrual. Determining the accrual of output torque in the powertrain may include receiving sensor data from an axle/motor torque sensor via a CAN bus. Selection of the powertrain operating mode may be performed manually by the driver and entered via an appropriate human machine interface (HMI).

Additional aspects of the disclosure are directed to algorithms, and control logic for utilizing vehicle infotainment and collision avoidance systems to provide select audible and tactile alerts to indicate an increasing amount of potential energy being built-up in the propulsion system for an expected vehicle maneuver in response to a driver mode selection. An increasing audible impulse cue provided by the vehicle's audio system indicates a ramp-up of EV propulsion system torque. The alert creates an audible representation of power status that essentially creates sound when none would otherwise exist because the vehicle is stationary. An increasing tactile cue applied by a haptic system to driver interfaces indicates a ramp-up of EV propulsion system torque. Also presented herein are non-transitory, computer readable media storing instructions executable by at least one of one or more processors of one or more programmable control units, such as an electronic control unit (ECU) or control module, to govern operation of any disclosed system.

The above summary does not represent every embodiment or every aspect of this disclosure. Rather, the above features and advantages, and other features and attendant advantages of this disclosure, will be readily apparent from the following detailed description of illustrative examples and modes for carrying out the present disclosure when taken in connection with the accompanying drawings and the appended claims. Moreover, this disclosure expressly includes any and all combinations and subcombinations of the elements and features presented above and below.

BRIEF DESCRIPTION OF THE DRAWINGS

FIG. 2 is a flowchart illustrating a representative torque buildup tracking and reporting protocol for an electric-drive powertrain system, which may correspond to memory-stored instructions executed by an onboard or remote controller, control-logic circuit, programmable electronic control unit, or other integrated circuit (IC) device or network of devices in accord with aspects of the disclosed concepts.

Figure 1:
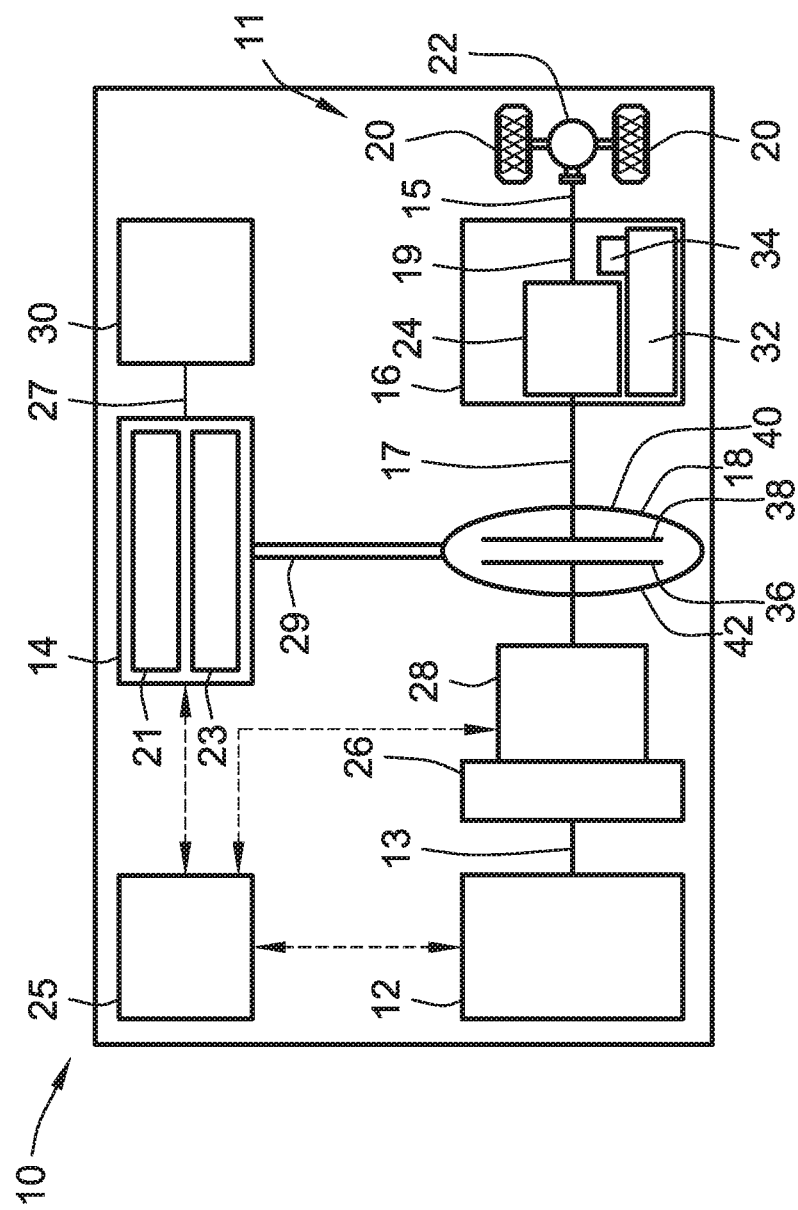
FIG. 1 is a schematic illustration of a representative electric-drive motor vehicle equipped with a hybrid powertrain having an electric traction motor powered by a rechargeable traction battery pack in accordance with aspects of the present disclosure.

The present disclosure is amenable to various modifications and alternative forms, and some representative embodiments are shown by way of example in the drawings and will be described in detail below. It should be understood, however, that the novel aspects of this disclosure are not limited to the particular forms illustrated in the above-enumerated drawings. Rather, the disclosure is to cover all modifications, equivalents, combinations, subcombinations, permutations, groupings, and alternatives falling within the scope of this disclosure as encompassed, for example, by the appended claims.

DETAILED DESCRIPTION

This disclosure is susceptible of embodiment in many different forms. Representative examples of the disclosure are shown in the drawings and herein described in detail with the understanding that these embodiments are provided as an exemplification of the disclosed principles, not limitations of the broad aspects of the disclosure. To that end, elements and limitations that are described, for example, in the Abstract, Introduction, Summary, and Detailed Description sections, but not explicitly set forth in the claims, should not be incorporated into the claims, singly or collectively, by implication, inference, or otherwise.

For purposes of the present detailed description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," and the like, shall each mean "including without limitation." Moreover, words of approximation, such as "about," "almost," "substantially," "generally," "approximately," and the like, may each be used herein in the sense of "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle, when the vehicle is operatively oriented on a horizontal driving surface.

Referring now to the drawings, wherein like reference numbers refer to like features throughout the several views, there is shown in FIG. 1 a schematic illustration of a representative automobile, which is designated generally at 10 and portrayed herein for purposes of discussion as a passenger vehicle with a parallel two-clutch (P2) hybrid-electric powertrain. The illustrated automobile 10—also referred to herein as "motor vehicle" or "vehicle" for short—is merely an exemplary application with which novel aspects and features of this disclosure may be practiced. In the same vein, implementation of the present concepts into a hybrid electric powertrain should also be appreciated as an exemplary application of the novel concepts disclosed herein. As such, it will be understood that facets and options of the present disclosure may be applied to other vehicle powertrain architectures, and may be incorporated into any logically relevant type of motor vehicle. Lastly, only select components are shown in the drawings and will be described in additional detail herein. Nevertheless, the vehicles and alert systems discussed below may include numerous additional and alternative features, and other available peripheral components, for carrying out the various methods and functions of this disclosure.

The representative vehicle powertrain system is shown in FIG. 1 with a prime mover—represented herein by a restartable internal combustion engine (ICE) assembly 12 and an electric motor/generator unit 14—that is drivingly connected to a driveshaft 15 of a final drive system 11 by a multi-speed automatic power transmission 16. The engine 12 transfers power, preferably by way of torque via an engine crankshaft 13 ("engine output member"), to an input side of the transmission 16. According to the illustrated example, the ICE assembly 12 drives a torsional damper assembly 26 and, through the torsional damper assembly 26, an engine disconnect device 28. This engine disconnect device 28, when operatively engaged, transmits torque received from the ICE assembly 12, by way of the damper 26, to input structure of a torque converter (TC) assembly 18. As the name implies, the engine disconnect device 28 may be selectively disengaged to drivingly disconnect the engine 12 from the motor 14, TC assembly 18, and transmission 16.

The transmission 16, in turn, is adapted to receive, selectively manipulate, and distribute tractive power from the engine 12 and motor 14 to the vehicle's final drive system 11—represented herein by a driveshaft 15, rear differential 22, and a pair of rear road wheels 20—and thereby propel the hybrid vehicle 10. The power transmission 16 and torque converter 18 of FIG. 1 may share a common transmission oil pan or "sump" 32 for supply of hydraulic fluid. A shared transmission pump 34 provides sufficient hydraulic pressure for the fluid to selectively actuate hydraulically activated elements of the transmission 16, the TC assembly 18 and, for some implementations, the engine disconnect device 28. It may be preferable, for at least some embodiments, that the engine disconnect device 28 comprise an active clutching mechanism, such as a controller-actuated selectable one-way clutch (SOWC) or friction-plate clutch, or a passive clutching mechanism, such as a ratchet-and-pawl or sprag-type freewheel OWC assembly.

The ICE assembly 12 operates to propel the vehicle 10 independently of the electric traction motor 14, e.g., in "engine-only" operating modes, or in cooperation with the motor 14, e.g., in "motor-boost" operating modes. Likewise, the motor 14 is operable to propel the vehicle 10 independently of the engine 12, e.g., in "motor-only" operating modes, and to provide auxiliary functionality, e.g., such as engine cranking operations and regenerative braking operations. In the example depicted in FIG. 1, the ICE assembly 12 may be any available or hereafter developed engine, such as a compression-ignited diesel engine or a spark-ignited gasoline or flex-fuel engine, which is readily adapted to provide its available power output typically at a number of revolutions per minute (RPM). Although not explicitly portrayed in FIG. 1, it should be appreciated that the final drive system 11 may take on any available configuration, including front wheel drive (FWD) layouts, rear wheel drive (RWD) layouts, four-wheel drive (4WD) layouts, all-wheel drive (AWD) layouts, six-by-four (6×4) layouts, etc.

FIG. 1 also depicts an electric motor/generator unit 14 that operatively connects via a motor support hub, shaft, or belt 29 ("motor output member") to torque converter 18, and via torque converter 18 to an input shaft 17 ("transmission input member") of the transmission 16. The motor/generator unit 14 may be directly coupled to a TC input shaft or drivingly mounted to a housing portion of the torque converter 18. The electric motor/generator unit 14 is composed of an annular stator assembly 21 circumscribing and concentric with a cylindrical rotor assembly 23. Electric power is provided to the stator 21 through electrical conductors or cables 27 that pass through the motor housing via suitable sealing and insulating feedthroughs (not illustrated). Conversely, electric power may be provided from the MGU 14 to an onboard traction battery pack 30, e.g., through regenerative braking. Operation of any of the illustrated powertrain components may be governed by an onboard or remote vehicle controller, such as programmable electronic control unit (ECU) 25. While shown as a P2 hybrid-electric architecture with a single motor in parallel power-flow communication with a single engine assembly, the vehicle 10 may employ other powertrain configurations, such as P0, P1, P2.5, P3 and P4 hybrid powertrains, any of which may be adapted for an REV, PHEV, range-extended hybrid vehicle, fuel-cell hybrid vehicle, FEVs, etc.

Power transmission 16 may use differential gearing 24 to achieve selectively variable torque and speed ratios between transmission input and output shafts 17 and 19, respectively, e.g., while sending all or a fraction of its power through the variable elements. One form of differential gearing is the epicyclic planetary gear arrangement. Planetary gearing offers the advantage of compactness and different torque and speed ratios among all members of the planetary gearing subset. Traditionally, hydraulically actuated torque establishing devices, such as clutches and brakes, are selectively engageable to activate the aforementioned gear elements for establishing desired forward and reverse speed ratios between the transmission's input and output shafts 17, 19. While envisioned as an 8-speed automatic transmission, the power transmission 16 may optionally take on other functionally appropriate configurations, including Continuously Variable Transmission (CVT) architectures, automated-manual transmissions, etc.

Hydrokinetic torque converter assembly 18 of FIG. 1 operates as a fluid coupling for operatively connecting the engine 12 and motor 14 with the internal epicyclic gearing 24 of the power transmission 16. Disposed within an internal fluid chamber of the torque converter assembly 18 is a bladed impeller 36 juxtaposed with a bladed turbine 38. The impeller 36 is situated in serial power-flow fluid communication with the turbine 38, with a stator (not shown) interposed between the impeller 36 and turbine 38 to selectively alter fluid flow therebetween. The transfer of torque from the engine and motor output members 13, 29 to the transmission 16 via the TC assembly 18 is through stirring excitation of hydraulic fluid, such as transmission oil, inside the TC's internal fluid chamber caused by rotation of the impeller and turbine 36, 38 blades. To protect these components, the torque converter assembly 18 is constructed with a TC pump housing, defined principally by a transmission-side pump shell 40 fixedly attached, e.g., via electron beam welding, MIG or MAG welding, laser welding, and the like, to an engine-side pump cover 42 such that a working hydraulic fluid chamber is formed therebetween.

During operation of the vehicle 10 of FIG. 1, the powertrain may switch between a variety of different operating modes that are calibrated to the propulsion hardware and architecture of the powertrain. Differences between individual powertrain operating modes may be typified by, for example, rule sets defining which of the available transmission gears may be used or may not be used, and at which points during vehicle operation shifting of these gears may occur. In addition, a powertrain operating mode may alter other characteristics of a driving experience, such as by varying the timing and levels of electric motor use in an HEV or FEV vehicle, power steering responsiveness, and brake system performance, as well as provisioning specific Advanced Driver Assistance System (ADAS) and controller-automated ("autonomous") features, etc. Some vehicle make, model and trim packages allow an occupant to switch between the different available operating modes, for example, in response to personal preferences, changing driving conditions, traffic, etc. The interface through which a vehicle occupant changes operating modes may take on any of a variety of suitable interfaces, such as buttons, knobs, dials, switches, trackpads, touchscreens, smartphones, keyboards, voice recognition module, etc.

Transitions between operating modes of HEV and FEV powertrain systems may produce clunks (i.e., audible noises) and jerks (e.g., physical lurches) as slack—resulting from driveline lash in the gear train—is taken out of the driveline, and torque-transmitting components within the driveline impact one another. "Driveline lash" refers to the clearance or play between the rotational positions of driveline components, such as slack between transmission splines, interleafed gearing teeth, etc. When a traction motor transitions from exerting a positive torque to exerting a negative torque, for example, the gears in the transmission, differential, transaxle, or transfer case may separate at a zero torque transition point. Then, after passing through the zero torque point, the gears again make contact to transfer torque. Such clearance is generally necessary to accommodate build variation and thermal expansion of powertrain components.

Presented herein are driver alert systems and methods that utilize, for example, a vehicle infotainment unit and operator-feedback collision avoidance system to provide audible, tactile, and/or visual alerts that denote an increasing amount of potential energy accruing in the propulsion system for an expected vehicle maneuver associated with a user-selected or vehicle-selected operating mode. Upon selection of a vehicle-calibrated EV operating mode, the powertrain traction motor(s) may begin to boost driveline torque for an anticipated vehicle maneuver. Energy is being delivered from the electric motor towards the drive wheels, but the wheels are not yet turning, e.g., due to applied brakes or the wheels are pressed against an object, like a rock or fallen tree in an off-road situation. A resident driver alert system concomitantly tracks the buildup of potential energy and progressively increases an audible or tactile cue that matches the dynamic increase of EV propulsion system torque. For at least some implementations, the vehicle audio system progressively increases an audible impulse or sound file to indicate the dynamic increase of EV propulsion system torque. Contemporaneous with, or as an alternative to the audible cue, a haptic system may apply a tactile cue to a driver interface, systematically increasing the vibrational output from the haptic system to track the dynamic increase in driveline torque.

With reference next to the flow chart of FIG. 2, an improved method or control strategy for tracking and reporting torque buildup in a powertrain system, such as the HEV-type, electric-drive powertrain of FIG. 1, of a motor vehicle, such as automobile 10 of FIG. 1, is generally described at 200 in accordance with aspects of the present disclosure. Some or all of the operations illustrated in FIG. 2 and described in further detail below may be representative of an algorithm that corresponds to processor-executable instructions that may be stored, for example, in main or auxiliary or remote memory, and executed, for example, by an on-board or off-board controller, processing unit, control logic circuit, or other module or device or network of modules/devices, to perform any or all of the above and below described functions associated with the disclosed concepts. It should be recognized that the order of execution of the illustrated operation blocks may be changed, additional operation blocks may be added, and some of the operation blocks described may be modified, combined, or eliminated.

Method 200 of FIG. 2 begins at terminal block 201 with processor-executable instructions for a programmable controller or control module or similarly suitable processor to call up an initialization procedure for a potential energy indication protocol. This routine may be executed in real-time, continuously, systematically, sporadically and/or at regular intervals, for example, each 100 milliseconds, during ongoing vehicle operation. As yet another option, terminal block 201 may initialize responsive to a user command prompt or a broadcast prompt signal received from a powertrain control module. Method 200 advances from terminal block 201 to selection input block 203 and receives a selection of a powertrain operating mode from a predefined set of operating modes calibrated to the subject vehicle's powertrain architecture. As indicated above, any such selection may be made manually by the driver via a suitable HMI. Driver-selectable powertrain operating modes, such as Tour, Sport, Track, Eco, Weather, Performance Launch, Rock Climb, Off Road, Terrain, etc., may change calibrated system settings and operational rule sets for the powertrain system, steering system, suspension system, and sound enhancement system.

Once the powertrain operating mode is selected, method 200 continues to data input block 205 to determine a current, real-time vehicle speed of the subject vehicle. Real-time vehicle speed may be derived from sensor data received from a vehicle speed sensor (VS S), such as a transaxle output sensor or a wheel speed sensor, over a controller area network (CAN) communications bus. At decision block 207, the method 200 determines whether or not the real-time vehicle speed is at or about zero (e.g., 0±10 mph). If not (block 207=NO), method 200 responds by executing subroutine block 209 and initiates a default driver feedback module. In accord with the illustrated example, the default setting may correspond to "Normal EVSE & Normal CAS Haptic feedback" settings that are operable to augment a predefined set of powertrain system sounds and provide select driver feedback cues. For instance, a Normal Electric Vehicle Sound Enhancement (EVSE) module may provision audible enhancements for natural EV propulsion system sounds during vehicle acceleration and deceleration, e.g., to provide a driver with a refined yet powerful sounding propulsion system. Moreover, a Normal Collision Avoidance System (CAS) Haptic feedback module may provision haptic cues to the driver to help preclude a vehicle collision, e.g., during an inadvertent lane departure, fore/aft/lateral collision, pedestrian collision, etc.

After confirming that the vehicle's current speed is approximately equal to zero (block 207=YES), method 200 responds by initiating a tracking and reporting protocol for powertrain torque buildup at process block 211. Triggering the indication protocol may entail prompting a predefined set of system sensors to begin generating requisite sensor data, calling up lookup tables for the alert system's feedback loop, and performing preliminary priming and conditioning of the alert system's sensory output devices. Advancing to subroutine block 213, method 200 begins a sequence of program instructions to perform tuning selection in order to modulate the alert system cues to the selected operating mode and current operating state of the vehicle. Tuning selection may involve reading the selected operating mode and concurrently leading appropriate tuning coefficients and vehicle speed (RPM) data to identify feedback cue parameters from dedicated torque-based tone, gain, and pitch tables, as will be described in further detail below. The tuning selection may utilize a continuous stream of torque data from a axle/motor torque sensor via an in-vehicle CAN bus to continuously change driver feedback audio output from sets of tones and sound file playback.

To facilitate tuning selection, the method 200 executes input data block 215 to retrieve a set of calibrated powertrain settings associated with the selected powertrain operating mode, and determine a suite of tuning coefficients assigned to these calibrated powertrain settings. Standard powertrain operating modes, such as ECO, Normal, Tour, etc., each has a distinct set of relatively constrained tuning parameters to provide a more refined driving experience. Conversely, high-performance powertrain operating modes, such as Sport, Off Road, Rock Climb, etc., may each have a distinct set of relatively aggressive tuning coefficients to provide a more intense driving experience. If a driver selects Eco or Tour modes, for example, a set of base tuning coefficients for the selected mode will be retrieved and loaded to ensure that the driver feedback cues are relatively subtle and, optionally, minimize the number of order sets and/or sound files used to reduce the complexity and level of the sound enhancement. When a driver chooses Sport or Off Road modes, in contrast, more audible content may be included in the tuning selection, which may be played at higher levels so as to become more noticeable at lower vehicle speeds and acceleration conditions.

With continuing reference to FIG. 2, tuning selection may be directly dependent upon a real-time, current motor torque accrued within the vehicle powertrain. In this regard, processor-executable instructions provided at input data block 217 cause a vehicle controller, such as programmable ECU 25 of FIG. 1, to actively monitor an accrual of torque that has been produced by the powertrain's electric traction motor(s) and temporarily stored within the driveline for use in one or more impending vehicle maneuvers associated with the selected powertrain operating mode. Real-time output torque accrual may be derived from sensor data received from a potential energy (torque) sensor, such as an axle-shaft or motor-shaft mounted rotational transducer over the vehicle's CAN communications bus.

After aggregating, processing, and fusing all requisite data that was input at blocks 211, 213, 215 and 217 of FIG. 2, method 200 thereafter accesses a collection of torque-based lookup tables stored in resident or remote memory, as indicated at database storage block 219. Each lookup table provides a series of calibrated output levels for a driver-feedback sensory output device, such as haptic driver chair 202, audio speaker 204, or electronic torque gauge 206, and associates each output level with a corresponding torque value in a progression of calibrated torque values for the powertrain. Four representative torque-based lookup tables are provided by way of example in FIG. 2: a 1st order set torque-based gain table 231 that correlates vibrational output signal gains of a haptic device with progressively increasing torque buildup values; an Nth order set torque-based gain table 233 that correlates acoustic output signal gains of an audio component with progressively increasing torque buildup values; a sound file (e.g., a Waveform (WAV) audio file format) torque-based gain table 235 that correlates sound file gains with progressively increasing torque buildup values; and a sound file torque-based pitch table 237 that correlates sound file pitches with progressively increasing torque buildup values. For at least some implementations, all available memory-stored, torque-based lookup tables are loaded, accessed and polled simultaneously for EVSE operation.

Upon completion of tuning selection at subroutine block 213 and torque-based signal modulation at database storage block 219, method 200 proceeds to process block 221 and outputs one or more command signals to one or more sensory output device in order to generate a driver-perceptible visible, audible, and/or tactile cue. As indicated above, the sensory output device may include a haptic transducer, such as a distributed array of haptic transducers packaged inside haptic driver chair 202, that outputs variable-magnitude haptic cues indicative of dynamic changes in torque accrued in the vehicle powertrain system. It should be appreciated that the haptic transducer may be located within any suitable occupant interface, such as a vehicle seat, steering wheel, brake or accelerator pedal, center console, armrest, etc. As a further option, the sensory output device may include an audio system component, such as audio speaker 204, that outputs variable-volume and variable-type sound cues indicative of dynamic changes in torque accrued in the vehicle powertrain system. In the same vein, the sensory output device may include an electronic display device, such as electronic torque gauge 206, that outputs a variety of visual cues indicative of dynamic changes in torque accrued in the vehicle powertrain system.

The command signals transmitted to the available sensory output device(s) may take on any suitable form, including a desired duty cycle, a desired voltage, and a desired time signal translation. A duty cycle may be defined as a predetermined time period within an available window of time during which a sensory output device is active (i.e., "ON time"). Voltage feed to a sensory output device may be modulated to govern device intensity, volume, brightness, etc. Time signal translation may be characterized as use of a memory-stored conversion table to transform one type of stimuli signal (tactile) to another type of stimuli signal (audible). The conversion table may take in a time domain stream of acoustic output and, at each sample, convert a respective frequency and magnitude set to a specific voltage corresponding to a magnitude of an acoustic signal, and then assign a corresponding duty cycle based on the frequency of the acoustic signal. Once these operations are completed, the method 200 of FIG. 2 may advance from process block 211 to a terminal block and temporarily discontinue, or may loop back to terminal block 201 by way of continuous trigger loop 223 and run in a continuous loop.

Aspects of this disclosure may be implemented, in some embodiments, through a computer-executable program of instructions, such as program modules, generally referred to as software applications or application programs executed by any of a controller or the controller variations described herein. Software may include, in non-limiting examples, routines, programs, objects, components, and data structures that perform particular tasks or implement particular data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by resident and remote-processing devices that are linked through a communications network. In a distributed-computing environment, program modules may be located in both local and remote computer-storage media including memory storage devices. Aspects of the present disclosure may therefore be implemented in connection with various hardware, software or a combination thereof, in a computer system or other processing system.

Any of the methods described herein may include machine readable instructions for execution by: (a) a processor, (b) a controller, and/or (c) any other suitable processing device. Any algorithm, software, control logic, protocol or method disclosed herein may be embodied as software stored on a tangible medium such as, for example, a flash memory, solid state memory, a hard drive, a CD-ROM, a digital versatile disk (DVD), or other memory devices. The entire algorithm, control logic, protocol, or method, and/or parts thereof, may alternatively be executed by a device other than a controller and/or embodied in firmware or dedicated hardware in an available manner (e.g., implemented by an application specific integrated circuit (ASIC), a programmable logic device (PLD), a field programmable logic device (FPLD), discrete logic, etc.). Further, although specific algorithms are described with reference to flowcharts depicted herein, many other methods for implementing the example machine-readable instructions may alternatively be used.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A driver alert system for an electric-drive vehicle, the electric-drive vehicle including a powertrain with an electric traction motor, the driver alert system comprising:
a sensory output device configured to mount to the electric-drive vehicle and generate visible, audible, and/or tactile outputs perceptible by a driver of the electric-drive vehicle;
a memory device storing a torque-based lookup table that correlates a series of calibrated output levels of the sensory output device with a progression of calibrated torque values of the electric traction motor; and
a controller communicatively connected to the sensory output device and the memory device, the controller being programmed to:
receive a selection of a powertrain operating mode for the powertrain;
determine a torque buildup of torque generated via the electric traction motor and stored in the powertrain in anticipation of an impending vehicle maneuver associated with the selected powertrain operating mode;
retrieve, from the torque-based lookup table stored in the memory device, an output level from the series of calibrated output levels associated with a torque value in the progression of calibrated torque values corresponding to the determined torque buildup; and
transmit a command signal to the sensory output device to generate a visible, audible, and/or tactile cue based on the retrieved output level.

2. The driver alert system of claim 1, wherein the controller is further programmed to:
responsive to receiving the selection of the powertrain operating mode, determine a real-time vehicle speed of the electric-drive vehicle; and
determine if the real-time vehicle speed is approximately equal to zero,
wherein the command signal is transmitted to the sensory output device responsive to a determination that the real-time vehicle speed is approximately equal to zero.

3. The driver alert system of claim 2, wherein determining the real-time vehicle speed of the electric-drive vehicle includes receiving sensor data from a vehicle speed sensor via a controller area network (CAN) bus.

4. The driver alert system of claim 2, wherein determining the torque buildup of torque stored in the powertrain is responsive to the determination that the real-time vehicle speed is approximately equal to zero.

5. The driver alert system of claim 2, wherein the controller is further programmed to, responsive to a determination that the real-time vehicle speed is not approximately equal to zero, initiate a default driver feedback module operable to generate supplemental sound configured to augment a predefined set of natural powertrain system sounds.

6. The driver alert system of claim 1, wherein the controller is further programmed to:
responsive to receiving the selection of the powertrain operating mode, determine a set of calibrated powertrain settings associated with the selected powertrain operating mode; and
determine a suite of tuning coefficients assigned to the set of calibrated powertrain settings,
wherein the retrieved output level for the sensory output device is based, at least in part, on the determined suite of tuning coefficients.

7. The driver alert system of claim 1, wherein the torque-based lookup table includes:
a sound tone set torque-based gain table correlating a series of tone signals with the progression of calibrated torque values;
a sound file torque-based gain table correlating a series of sound file gains with the progression of calibrated torque values; and
a sound file torque-based pitch table correlating a series of sound file pitches with the progression of calibrated torque values.

8. The driver alert system of claim 1, wherein the sensory output device includes a haptic transducer, and wherein the command signal causes the haptic transducer to generate a dynamic haptic cue indicative of a dynamic change in the torque buildup.

9. The driver alert system of claim 1, wherein the sensory output device includes an audio system component, and wherein the command signal causes the audio system component to generate a dynamic sound output indicative of a dynamic change in the torque buildup.

10. The driver alert system of claim 1, wherein the sensory output device includes an electronic display device, and wherein the command signal causes the electronic display device to generate a dynamic visual output indicative of a dynamic change in the torque buildup.

11. The driver alert system of claim 1, wherein determining the torque buildup of the electric traction motor includes receiving sensor data from an axle/motor torque sensor via a controller area network (CAN) bus.

12. The driver alert system of claim 11, wherein the selection of the powertrain operating mode is received from the driver via a human machine interface (HMI).

13. An electric-drive vehicle, comprising:
a vehicle body with a passenger compartment and multiple road wheels;
a powertrain attached to the vehicle body and including an electric traction motor operable to output torque to one or more of the road wheels and thereby propel the vehicle;
a sensory output device attached to the vehicle body and located inside the passenger compartment, the sensory output device being configured to generate visible, audible, and/or tactile outputs perceptible by a driver of the electric-drive vehicle;
a memory device storing a torque-based lookup table that correlates a series of calibrated output levels of the sensory output device with a progression of calibrated torque values of the electric traction motor; and
a controller communicatively connected to the sensory output device and the memory device, the controller being programmed to:
receive a selection of a powertrain operating mode for the powertrain;
determine an torque buildup of torque generated via the electric traction motor and stored in the powertrain in anticipation of an impending vehicle maneuver associated with the selected powertrain operating mode;
retrieve, from the torque-based lookup table stored in the memory device, an output level from the series of calibrated output levels associated with a torque value in the progression of calibrated torque values corresponding to the determined torque buildup; and
transmit a command signal to the sensory output device to generate a visible, audible, and/or tactile cue based on the retrieved output level.

14. A method of operating a driver alert system for an electric-drive vehicle, the electric-drive vehicle including a powertrain with an electric traction motor, the method comprising:
- receiving, via a vehicle controller, a selection of a powertrain operating mode for the powertrain;
- determining, via the vehicle controller responsive to receiving the selected powertrain operating mode, an torque buildup of torque generated via the electric traction motor and stored in the powertrain for the selected powertrain operating mode;
- accessing a torque-based lookup table stored in a memory device, the torque-based lookup table correlating a series of calibrated output levels of a sensory output device with a progression of calibrated torque values of the electric traction motor;
- retrieving, via the controller from the torque-based lookup table, an output level from the series of calibrated output levels associated with a torque value in the progression of calibrated torque values corresponding to the determined torque buildup; and
- transmitting, via the controller to the sensory output device, a command signal to generate a driver-perceptible visible, audible, and/or tactile cue based on the retrieved output level.

15. The method of claim 14, further comprising:
- determining, via the vehicle controller responsive to receiving the selection of the powertrain operating mode, a real-time vehicle speed of the electric-drive vehicle; and
- determining if the real-time vehicle speed is approximately equal to zero,
- wherein the command signal is transmitted to the sensory output device responsive to a determination that the real-time vehicle speed is approximately equal to zero.

16. The method of claim 15, wherein the torque buildup of torque generated via the electric traction motor is determined responsive to the determination that and while the real-time vehicle speed is approximately equal to zero.

17. The method of claim 15, further comprising initiating, responsive to a determination that the real-time vehicle speed is not approximately equal to zero, a default driver feedback module operable to augment a predefined set of powertrain system sounds.

18. The method of claim 14, further comprising:
- responsive to receiving the selection of the powertrain operating mode, determine a set of calibrated powertrain settings associated with the selected powertrain operating mode; and
- determine a suite of tuning coefficients assigned to the set of calibrated powertrain settings,
- wherein the retrieved output level for the sensory output device is based, at least in part, on the determined suite of tuning coefficients.

19. The method of claim 14, wherein the torque-based lookup table includes:
- a sound tone torque-based gain table correlating a series of tone signals with the progression of calibrated torque values;
- a sound file torque-based gain table correlating a series of sound file gains with the progression of calibrated torque values; and
- a sound file torque-based pitch table correlating a series of sound file pitches with the progression of calibrated torque values.

20. The method of claim 14, wherein the sensory output device includes a haptic transducer, and wherein the command signal causes the haptic transducer to generate a dynamic haptic cue indicative of a dynamic change in the torque buildup.

* * * * *